UNITED STATES PATENT OFFICE.

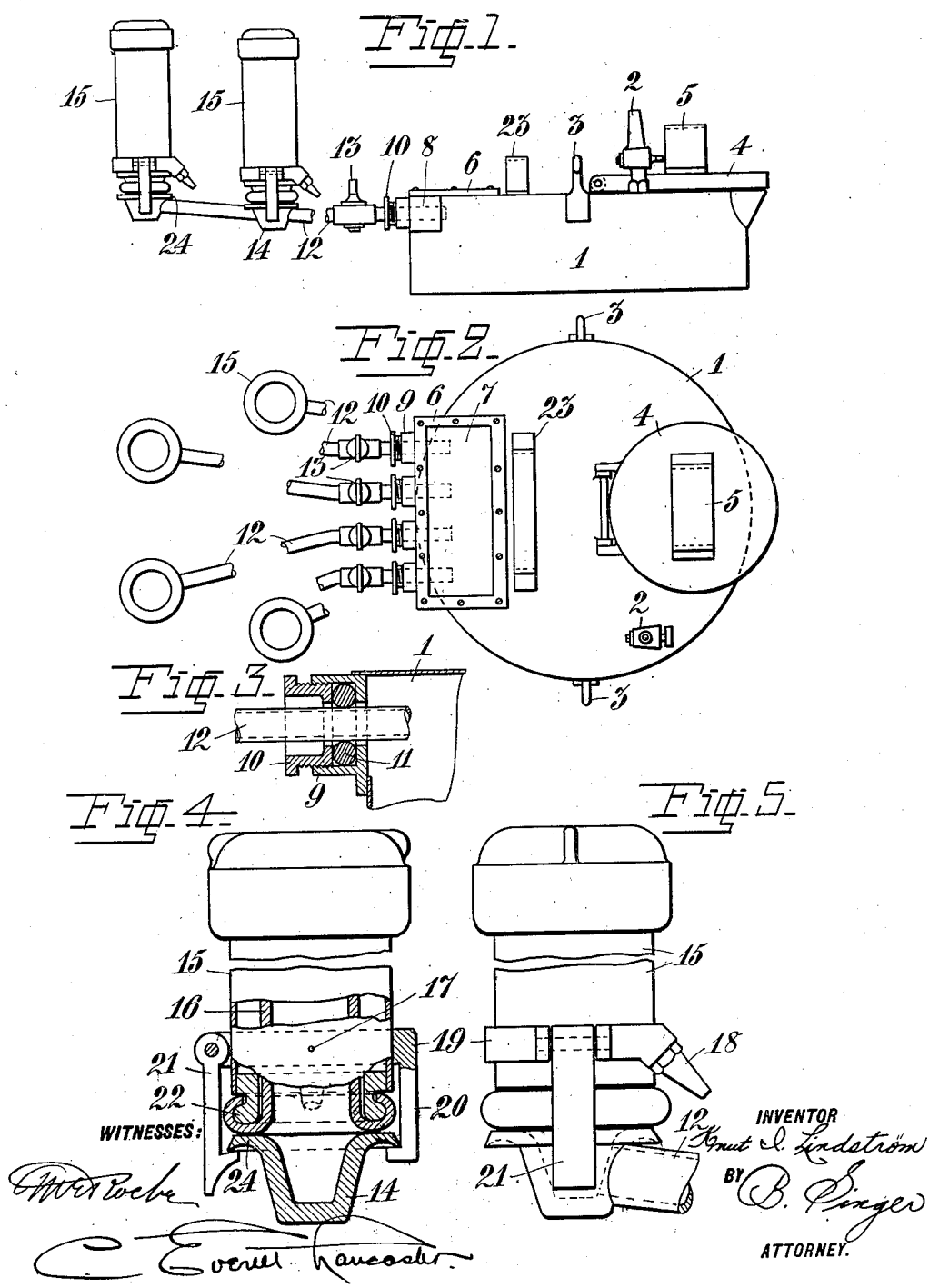

KNUT IVAR LINDSTRÖM, OF NYKVARN, SWEDEN.

MILKING-MACHINE.

1,045,991.  Specification of Letters Patent.  Patented Dec. 3, 1912.

Application filed June 13, 1912. Serial No. 703,504.

*To all whom it may concern:*

Be it known that I, KNUT IVAR LINDSTRÖM, a subject of the King of Sweden, and a citizen of Sweden, residing at Nykvarn, in the Kingdom of Sweden, have invented certain new and useful Improvements in Milking-Machines, of which the following is a specification.

My present invention relates to milking machines of the kind in which the milk is sucked or pressed out of the udder of the cow by means of vacuum or pressure or alternate vacuum and pressure.

In all machines of this kind hitherto constructed the milk is sucked from the udder into a milk receiver placed beside the cow, by means of more or less long and branched tubes of india rubber. This arrangement, however, suffers from two considerable inconveniences which lessen to an essential degree the practical value of these machines. Firstly the said tubes can only be kept free from dirt and bacteria by the most minute and time-consuming cleanings. These machines will thus, according to what experience has taught us, become more or less unhygienic and difficult to keep clean. Secondly it is impossible to observe when a teat is milked out and as it practically never occurs that all the teats are milked out simultaneously, one or more of the glands of the udder which are exposed to suction after having been emptied of the milk will sometimes be overmilked, so that the delicate glandular tissue of the udder breaks and an inflammation injurious to the udder ensues. These two inconveniences will be totally overcome by the present invention, wherein the teat cups, by means of fixed inflexible pipes or by means of pipes having flexible joints, are so connected with an adjustable connection inserted into the wall of the milk receiver, said receiver itself being attached to the cow, that the tubes can be displaced relatively to the milk receiver and also be turned, whereas simultaneously a complete tightening is maintained between tube and milk receiver. According to the present invention the teat cups furthermore are arranged so as to be easily cleansed.

The invention is shown on the accompanying drawing where—

Figures 1 and 2 show the milking machine seen respectively from the side and from above. Fig. 3 shows specially the adjustable connection between a pipe and the milk receiver, and Figs. 4 and 5 show an elevation of a teat cup in two different positions.

The machine consists of an air-tight milk receiver 1 connected with the suction conduit by means of the cock 2 and suspended, by means of the hooks 3, in a girt resting upon the back of the cow. On the upper side of the milk receiver 1 there is an air-tightly closing cover 4, to which the pulsator (not shown in the drawing) is secured by means of the bow 5. There is further a handle 23 on the cover and a frame 6 in which is airtightly arranged a disk 7 of any transparent material, for instance celluloid, for the purpose of observing the interior of the milk receiver. On the vertical part 8 of the frame 6, said part being turned to the udder, are arranged four sockets 9 (see Fig. 3) threaded on the inside. In the said sockets the nuts 10 are screwed. Between the sockets 9 and nuts 10 there are packings 11 preferably consisting of a ring of an elastic material, for instance india rubber, or consisting of a tubular ring or the like filled with compressed air. Through the nut, the ring and the frame opening passes the pipe 12 that can be moved into and out of the milk receiver, when the nut is not screwed in. When introducing the nut the ring 11 is pressed together and dilated circumferentially thereby forming a tightening between the pipe and the frame opening. On account of the elasticity of the packing the pipe can be moved in all positions to a certain degree. Each pipe 12 is provided with a cock 13 and in its free end with a flanged cup 14.

The teat cup (Figs. 4 and 5) consists of an outer shell 15 of metal and an inner shell 16 of india rubber. Between 15 and 16 there is a space communicating through the hole 17 and the mouth piece 18 by means of an elastic tube (not shown) with the pulsator 5 arranged on the cover 4, said pulsator exercising an intermittent vacuum and pressure, for instance atmospheric pressure, in the space between 15 and 16. On the metal shell 15 there is arranged a ring 19 having a fixed hook 20 and a turnable hook 21, said hooks grasping the flange 24 on the cup 14 and pressing it air-tightly against the shell 16, the lower part of which is bent over the flange 22 which is secured to the bottom part of the metal shell 15.

From the construction it will be seen firstly that the milk is led from the teat cup to the milk receiver by metal pipes which can be thoroughly cleansed, secondly that the teat elements can be moved, within certain limits, in all positions, thirdly that a perfect tightening between the teat elements and the milk receiver is attained, fourthly that the teat cup can be easily removed from the pipe for cleansing purposes and finally that it is possible to observe through the disk 7 of the milk receiver when one or more teats are milked out, and then to set the corresponding teat element out of action by shutting the cock 13.

This machine thus meets all hygienic and sanitary demands of a milking machine of the vacuum system. The conduit connecting the teat cup with the milk receiver also may consist of two or more pipes connected with each other by means of elastic sockets or flexible joints, in which case the packings on the milk receiver need not be so elastic as to permit a lateral bending of the conduit. It is obvious that the locking device 19, 20, 21 and 22 also may be replaced by any other suitable device, for instance a bayonet-lock or the like.

Having now fully described my invention, what I claim and desire to protect by Letters Patent is:—

1. A milking machine comprising in combination, a milk receiver adapted to be suspended from an animal, teat engaging devices, rigid tubes connected with said devices, and air tight means adjustably connecting said rigid tubes with said receiver, substantially as described.

2. A milking machine comprising in combination, a milk receiver adapted to be suspended from the animal, means for maintaining a partial vacuum in said receiver, teat engaging devices, rigid tubes connected with said devices, and means adjustably connecting said rigid tubes with said receiver, said means forming an air tight and fluid tight connection, substantially as described.

3. A milking machine comprising in combination, a milk receiver adapted to be suspended from the animal, teat engaging devices, rigid tubes rigidly connected with said devices, and means adjustably and rigidly connecting said tubes with said receiver, substantially as described.

4. A milking machine comprising in combination, a milk receiver, teat engaging devices, rigid tubes, means rigidly and detachably connecting said tube with said devices, and means rigidly and adjustably connecting said tubes with said receiver, substantially as described.

5. A milking machine comprising in combination, a milk receiver adapted to be suspended from the animal, teat engaging devices, rigid tubes, means detachably connecting said tubes with said devices, means detachably connecting said tubes with said receiver, substantially as described.

6. A milking machine comprising in combination, an enveloping device comprising an inner elapsible shell or tube adapted to surround the teat, an outer rigid shell or tube spaced apart from the inner tube to form an intermediate chamber, air-tight connecting means for said inner and outer tubes, a milk receiver, and rigid tubes connecting said devices with said receiver.

7. A milking machine comprising in combination, an air tight milk receiver provided with an opening and adapted to be suspended from the animal, a rigid pipe projecting into said opening, an annular yielding packing surrounding said pipe adjacent the wall of said opening, and means collapsing said packing against said pipe and the wall of said opening thereby forming an adjustable and air tight connection between said pipe and receiver, substantially as described.

In testimony whereof I have affixed my signature in presence of two witnesses.

KNUT IVAR LINDSTRÖM.

Witnesses:
GRETA PRISEL,
TH. WAWRINSKY.